United States Patent [19]

McCown

[11] 4,116,150
[45] Sep. 26, 1978

[54] CRYOGENIC INSULATION SYSTEM

[75] Inventor: Thomas E. McCown, Huntington Beach, Calif.

[73] Assignee: McDonnell Douglas Corporation, Long Beach, Calif.

[21] Appl. No.: 665,285

[22] Filed: Mar. 9, 1976

[51] Int. Cl.$^2$ .................. B63B 25/08; B65D 25/18
[52] U.S. Cl. .................. 114/74 A; 220/452; 220/901
[58] Field of Search .................. 114/74 A, 74 R; 220/9 LG, 15

[56] References Cited

U.S. PATENT DOCUMENTS

| | | | |
|---|---|---|---|
| 2,858,136 | 10/1958 | Rind | 114/74 A |
| 3,112,043 | 11/1963 | Tucker | 220/15 X |
| 3,298,345 | 1/1967 | Pratt | 220/15 |
| 3,337,079 | 8/1967 | Clarke et al. | 114/74 A |
| 3,339,783 | 9/1967 | Gorman | 220/15 |
| 3,399,800 | 9/1968 | Gilles | 114/74 A X |
| 3,403,651 | 10/1968 | Gilles | 114/74 A |
| 3,547,302 | 12/1970 | Jackson et al. | 114/74 A |
| 3,682,346 | 8/1972 | Sterrett | 114/74 A X |
| 3,698,588 | 10/1972 | Pogorski | 220/15 |
| 3,785,320 | 1/1974 | Bourgeois et al. | 114/74 |
| 3,814,275 | 6/1974 | Lemons | 220/9 LG |
| 3,931,424 | 1/1976 | Helf | 114/74 A |

Primary Examiner—Robert B. Reeves
Assistant Examiner—Edward M. Wacyra
Attorney, Agent, or Firm—Max Geldin

[57] ABSTRACT

Cryogenic insulation system for containers for storage of cryogenic liquefied gases such as LNG, comprised of a low temperature resistant metal, preferably high nickel steel, primary membrane or liner supported by a primary layer of reinforced foam insulation, and a secondary liner positioned adjacent to and sandwiched between the primary layer of foam insulation and a secondary layer of reinforced foam insulation. The preferably high nickel steel primary liner or membrane is attached to the primary layer of foam insulation by tongues of high nickel steel connected to the primary membrane at spaced positions therealong, and engaged in plywood retainers positioned within and bonded to the primary foam insulation layer. The plywood retainers for such tongues include spaces or channels in communication with a manifold for detection of cryogenic gas leakage. There is provided at corners, particularly at 90° corners, and disposed within the primary and secondary foam insulation layers, a cooperating system of a plastic coupler, threaded rod and plywood supports, the plywood supports being attached to the primary high nickel steel liner and the coupler to the container wall or ship hull. For oblique corner angles such as 135° angles of the cryogenic container or tank, there is provided a system of high nickel steel corner members welded to the primary high nickel steel liner, such corner members being supported on angular plywood corner supports positioned in the primary foam layer. Support systems at three way corners are also provided, including a trihedron angle member connected to the primary liner, plywood supports for the primary liner at such corners, such plywood supports being positioned in the primary foam insulation adjacent the primary high nickel steel liner, and a combination of tubes, e.g. fiber glass tubes, connected at one end to the trihedron angle member and at the other end to the container or tank wall. Stand-off or insulation support panels can also be provided for the entire insulation system, together with means to maintain the panels spaced from the container wall or ship hull.

22 Claims, 19 Drawing Figures

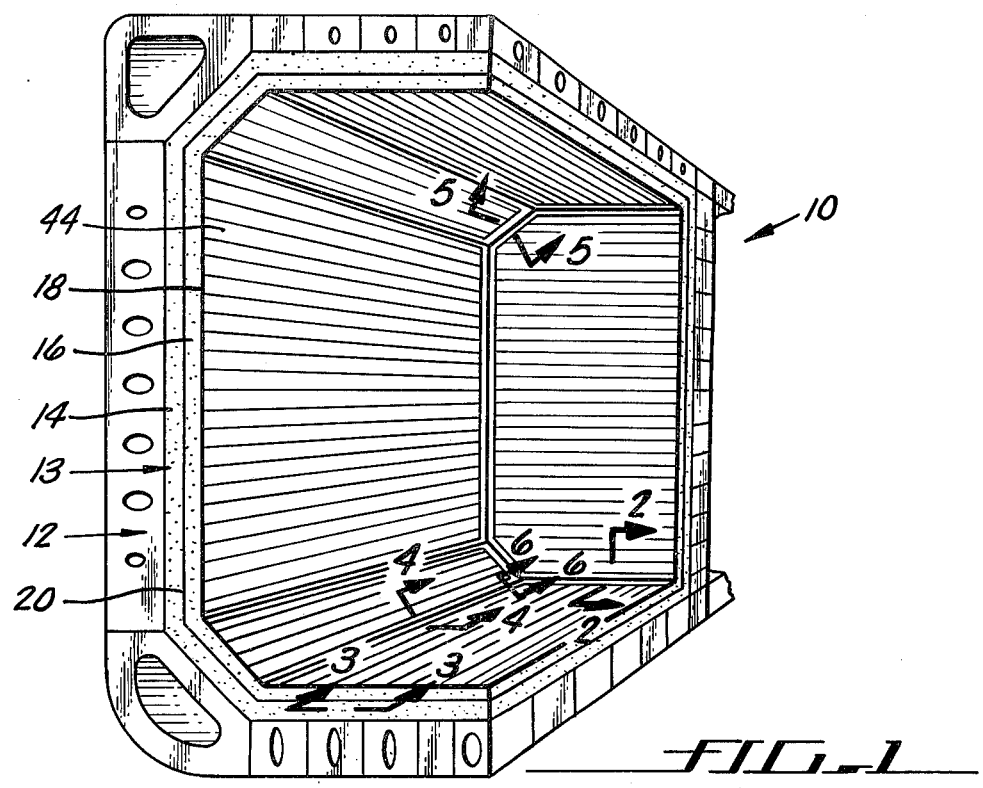
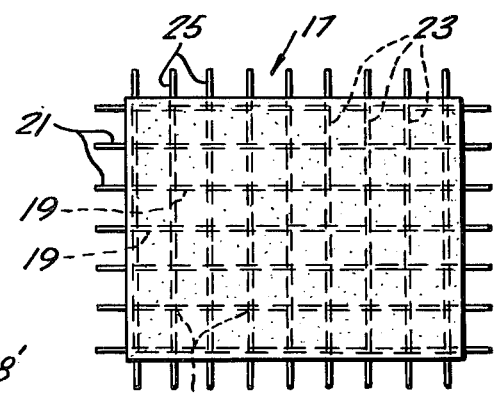
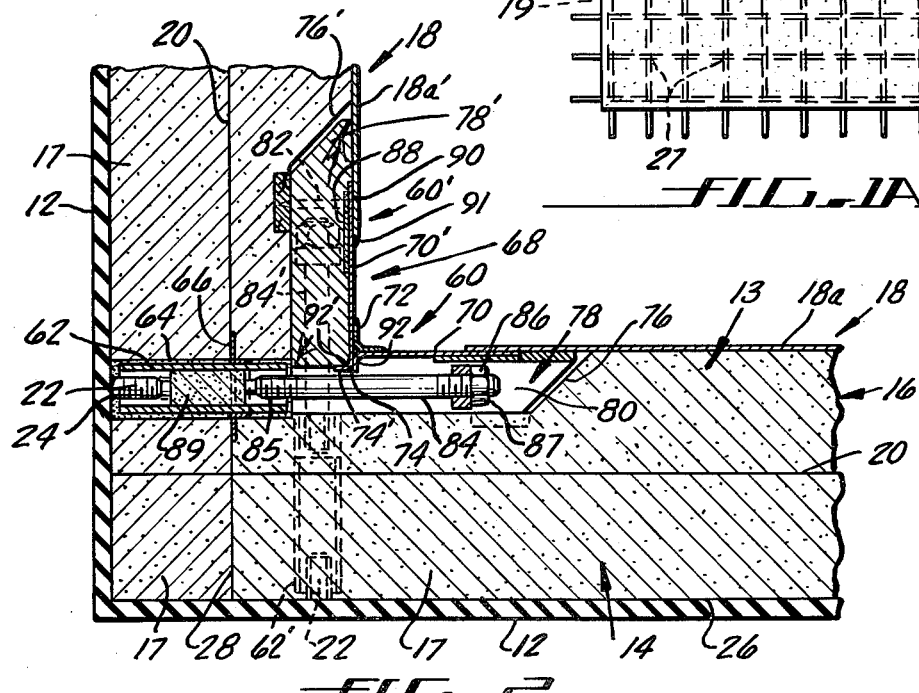

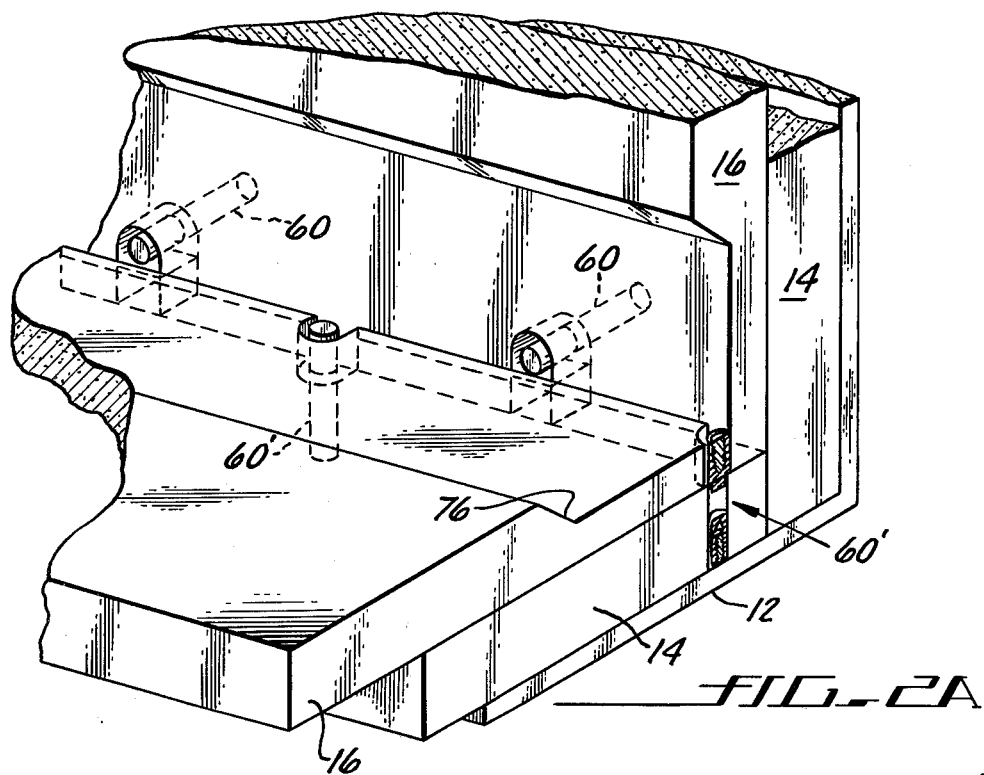
FIG._2A
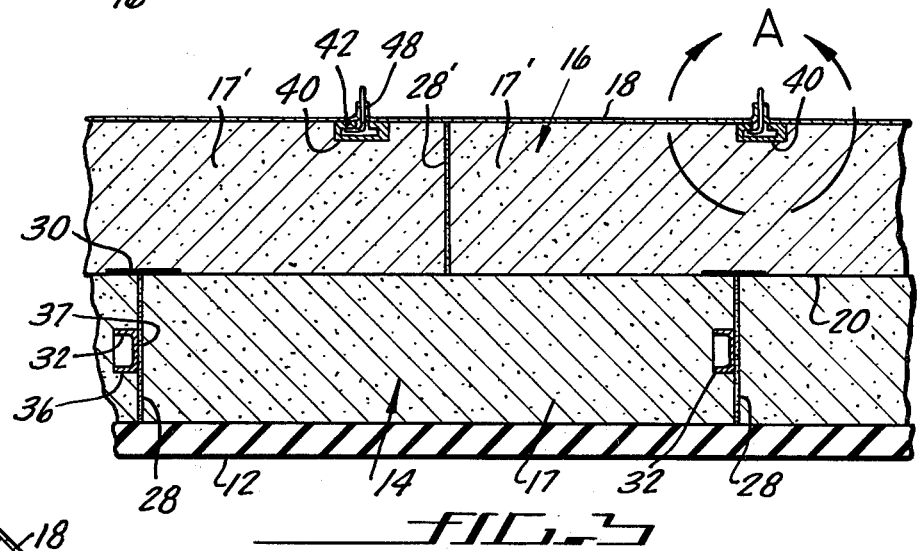
FIG._3
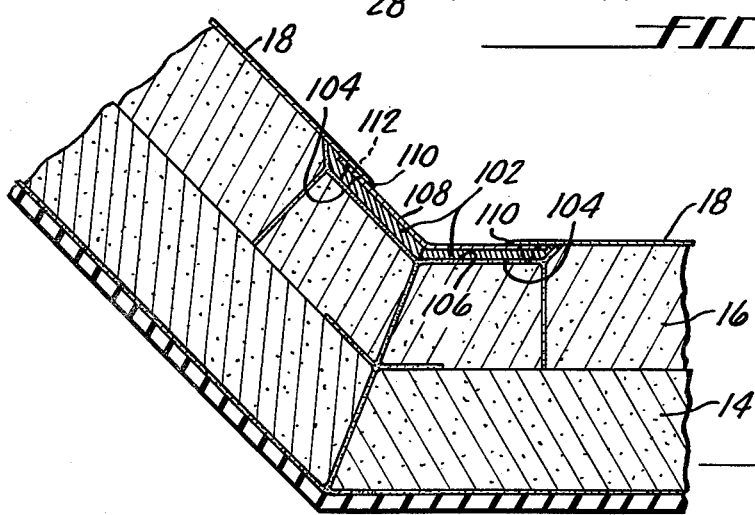
FIG._4

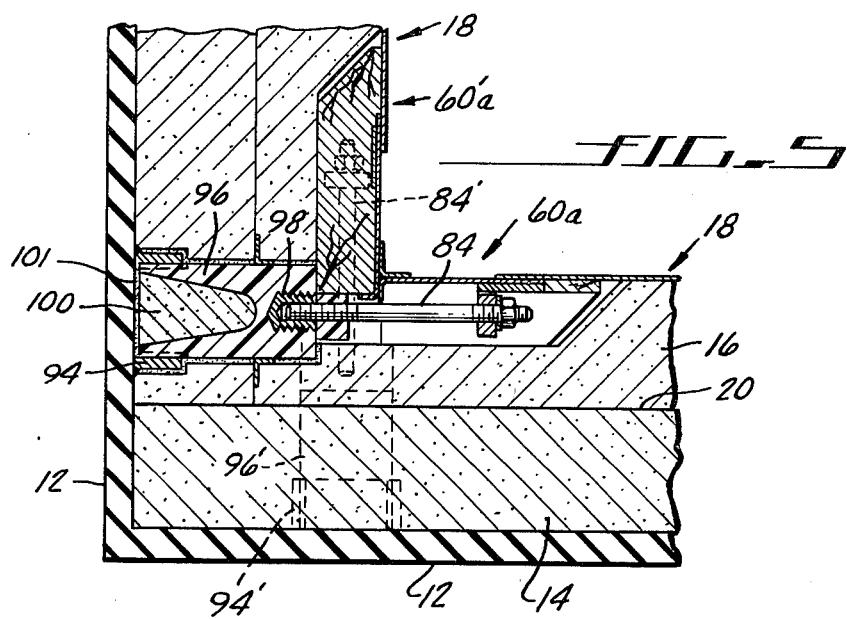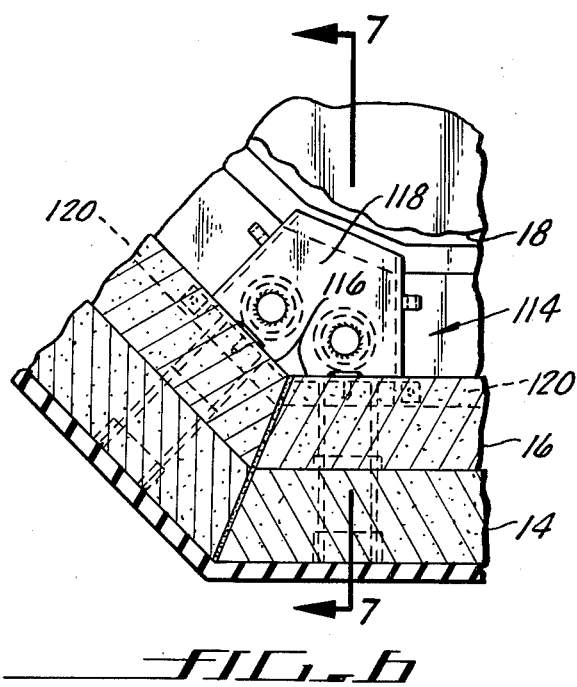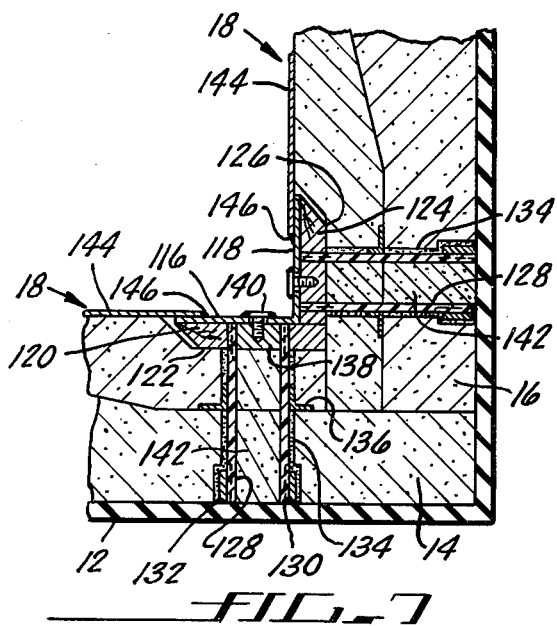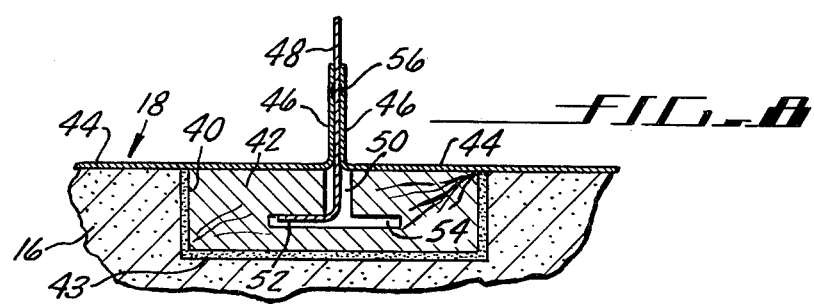

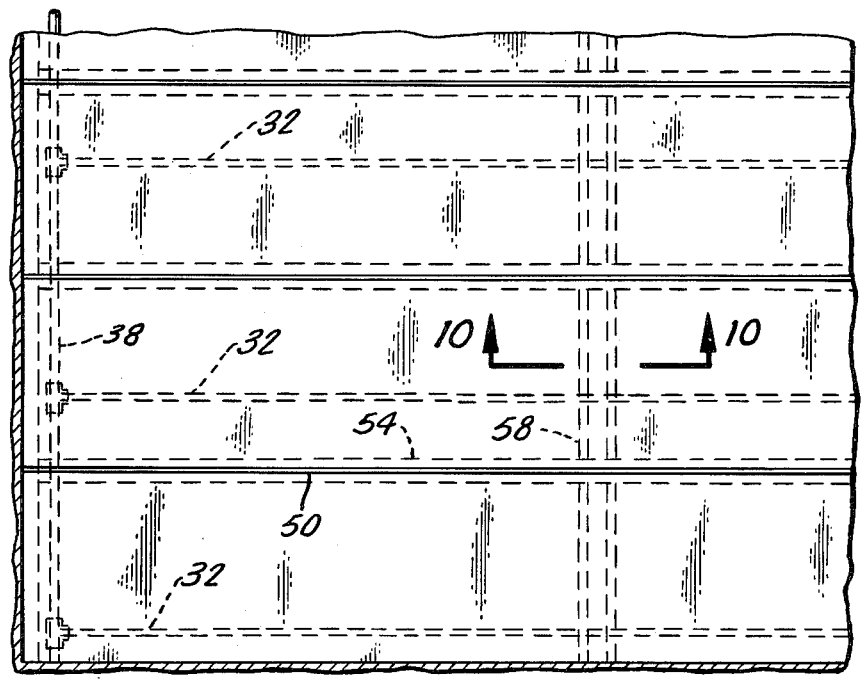
FIG_9
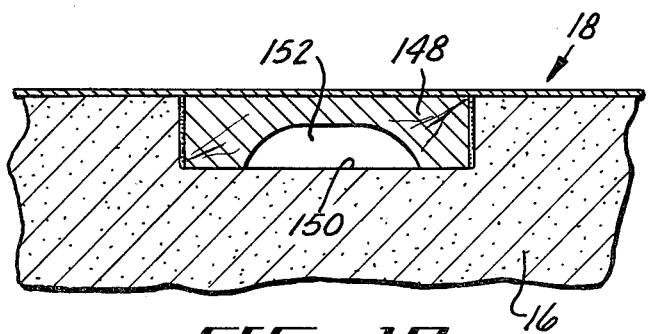
FIG_10
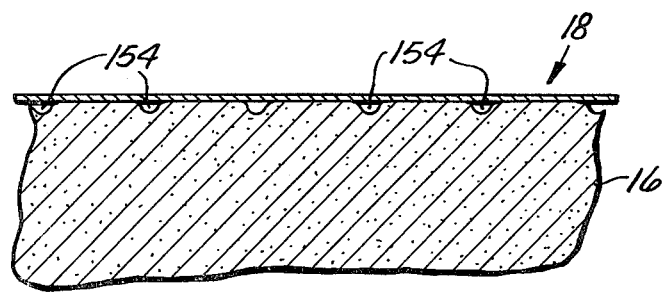
FIG_11

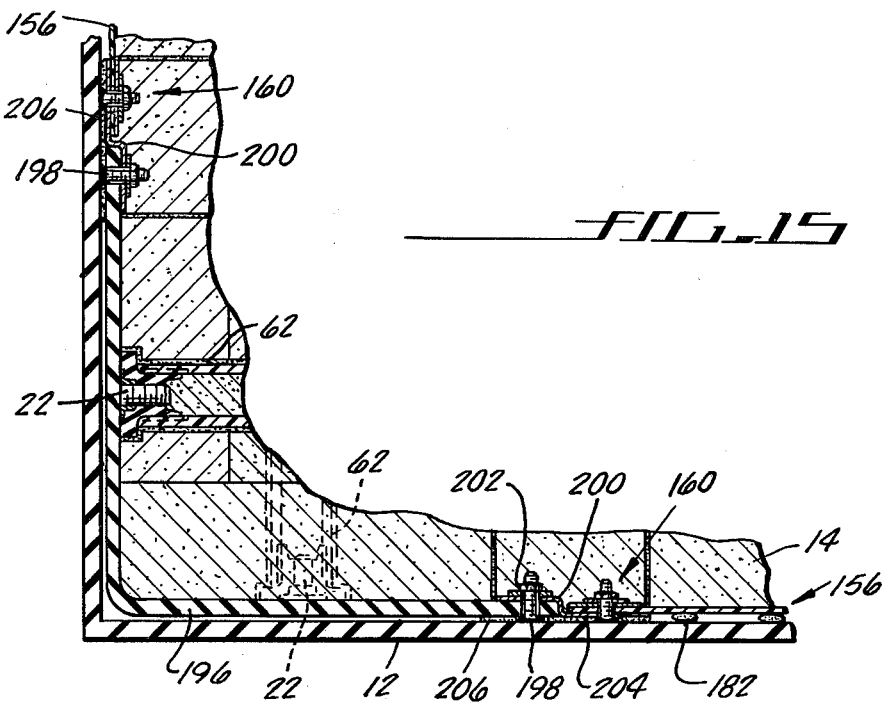
FIG_15
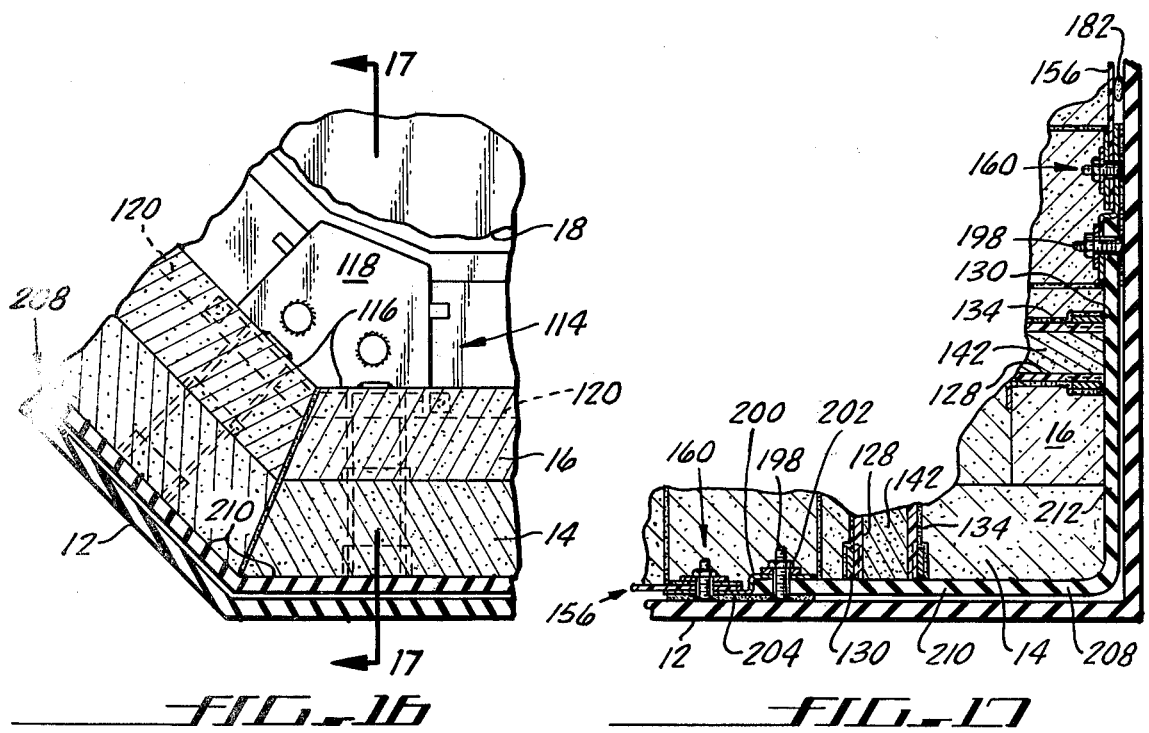
FIG_16  FIG_17

CRYOGENIC INSULATION SYSTEM

BACKGROUND OF THE INVENTION

This invention relates to containers, tanks or ships, for the storage or transportation of cryogenic liquids such as liquid natural gas (LNG), and is particularly concerned with containers, tanks or ships of the above type containing non-metallic, e.g. plastic, foam insulation and one or more liners, and preferably a low temperature resisting, i.e. low thermal expansion, liner such as nickel steel, and a support system for the liner or membrane, in conjunction with the foam insulation layers.

A container or tanker for the storage and/or transportation of a cryogenic liquid must be designed to withstand extremely cold temperatures. Generally vessels of this type are composed of an outer wall of a rigid structure, a heat insulating layer provided at the inside surface of such wall and an inner membrane on the inside surface of such heat insulating layer. Often several heat insulating layers of non-metallic, e.g., plastic, foam insulation, are employed and one or more membranes, an inner liner or membrane such as a nickel steel liner in contact with the cryogenic liquid and one or more additional secondary liners positioned between foam insulation layers. The primary liners, generally made of a thin low temperature resistant (low thermal expansion) material such as nickel steel, is maintained in close contact with the surface of the adjacent heat insulating layer and transmits the internal pressure applied by the low temperature liquefied gases through the heat insulating layers to the outer container or the hull of a tanker.

Of particular importance, the container or its insulation system must be capable of withstanding the thermal strains induced by the cold liquid and the transients during the cooling and warming cycles caused by the loading and unloading of the liquid, and the mechanically induced strains from the ship hull or container displacement during operation. The magnitude of such thermal strains induced when cooling most materials, in a restrained condition, to cryogenic temperatures is sufficient to cause yielding of the material, particularly the thin metal membranes employed as liners. This yielding will result in fracture and failure of such materials on subsequent warming and cooling cycles resulting in a failure of the system. Many designs and materials have been proposed to solve this problem. However, generally the solution to this problem has resulted in relatively complex membrane support systems which are often difficult to fabricate and are expensive.

Illustrative of the prior art in this respect are the following patents. U.S. Pat. No. 3,724,703 discloses a low temperature liquefied gas storage tank and tanker comprising a heat insulating layer of polyurethane foam, a thin liner, e.g. of nickel steel, and a vacuum pump to detect leaks. U.S. Pat. No. 3,489,311 discloses a multilayer foam insulation system, employing grooves or precut channels in the insulation and a vacuum pump as part of a leak detection system U.S. Pat. No. 3,341,049 discloses a multilayer insulation system including honeycomb panels, and employing an expansion joint to connect the honeycomb panels and form a seal at the primary linear. U.S. Pat. Nos. 3,931,424; 3,882,591; 3,319,431; 3,692,205; 3,694,986; and 3,341,051 are further illustrative of the prior art with respect to support systems for the foam insulation and the linear or membrane in cryogenic tanks.

SUMMARY OF THE INVENTION

It is accordingly an object of the present invention to provide novel and effective system for supporting both the primary and secondary foam insulation layers, and particularly the primary metal membrane or liner, in a cryogenic liquid tank, vessel or tanker, against rupture or failure due to thermal or mechanical strains, and also to provide novel corner support systems to react against the tension or tension and bending of the primary liner when the tank is loaded with cryogenic liquid, and also to provide leak detection systems in both the primary and secondary insulation layers, in conjunction with affording proper support for both the primary and secondary liners.

The above objects are accomplished according to the invention by the provision of a design which comprises plastic insulation, particularly layers of reinforced plastic foam insulation, in combination with a primary inner membrane, particularly a low temperature resistant nickel steel membrane, wherein such membrane is unbonded to the adjacent foam insulation but is connected thereto by a tongue arrangement, the tongues being received and held in position within tongue retainer members positioned within the primary foam insulation adjacent the primary membrane. The channels in the retainer members which receive the tongues also serve for detection of leaks of cryogenic liquid or gas through the primary liner and into the adjacent primary insulation.

The insulation system also includes a secondary barrier or foam insulation layer employing a secondary liner such as for example aluminum foil, fiber glass cloth, or polyvinyl fluoride (Tedlar) as a secondary barrier containment system if the primary barrier system fails. The secondary barrier system is also provided with leak detection channels to detect leaks through the secondary liner and into the secondary foam insulation.

An additional feature of the invention system is the provision of corner structures particularly designed to react to the tension loads on the primary membrane at the corners when the tank or tanker is loaded with cryogenic liquid. For this purpose there is provided at the corners, particularly at the 90° corners, a system of insulating couplers and rods threaded therein, which react against plywood corner supports for transmitting tension loads from the primary membrane to the outer wall or hull of the tank or ship. Various other corner designs including the provision of plywood corner supports in conjunction with mating and cooperating corner members are also provided for membrane reinforcement, for example at corner angles in the tank or ship having oblique angles.

As an alternative feature, the primary insulation adjacent the primary barrier or liner can be roughened or provided with grooves to afford leak detection channels for the entire primary membrane, and also permitting removal of oxygen in the primary insulation space.

The foam insulation layers are preferably fiber reinforced foam insulation, e.g. employing glass fibers, and are most desirably formed of so-called three dimensional reinforced glass fiber foam insulation wherein the glass fibers are arranged in X, Y and Z axes, such 3D foam insulation particularly transmitting forces in tension as well as in compression. According to the invention system, substantially all of the space between the primary and secondary liners or membranes and between the secondary liner and the adjacent tank wall or ship hull is filled with the foam insulation and resists loads without cracking. This system affords the safety feature that if penetration of cryogenic liquid or LNG through the membranes passes into such insulation, leakage is generally held to a local area and will not endanger the container with cryogenic temperatures.

The structure of the invention is particularly designed to take high corner loads in tension and also to take bending loads where the latter loads are also present such as at three way or trihedron corners. The couplers which are provided at the corners as noted above take the tension load from the primary membrane directly into the tank wall or ship hull, and such coupler can have a non-metallic portion as an aid in controlling thermodynamic characteristics. Such couplers also are sealed to the secondary liner to prevent penetration of cryogenic liquid in case the primary liner is penetrated and the layer of foam insulation adjacent such membrane is also penetrated.

As an additional feature, stand-off or insulation support panels, preferably formed of resin impregnated fiber glass, or laminated wood, are provided to support the entire insulation system and means are provided to maintain the panels spaced from the container wall or ship hull, and the corners thereof. This avoids adhesive bonding of the foam insulation system to the tank wall or ship hull, and provides a sump to trap water and keep it from penetrating into the foam insulation system.

BRIEF DESCRIPTION OF THE DRAWING

The invention will be more fully understood by the description below of a preferred embodiment taken in connection with the accompanying drawing wherein:

FIG. 1 is a perspective view showing a midship and center line section of a methane (LNG) tanker containing an insulation system according to the invention;

FIG. 1a illustrates a preferred type of fiber reinforced insulation material employed in the system of FIG. 1;

FIG. 2 is a 90° transverse corner section of the tanker, taken on line 2—2 of FIG. 1;

FIG. 2a is an isometric view of the alternate positioning of the adjacent coupler and rod systems shown in FIG. 2;

FIG. 3 is a transverse section through the foam insulation and associated liner system, taken on line 3—3 of FIG. 1;

FIG. 4 is a section taken on line 4—4 of FIG. 1, showing the construction at a 135° longutudinal corner;

FIG. 5 is a section taken on line 5—5 of FIG. 1, showing the structure of a 90° corner on an oblique interface;

FIG. 6 is a section taken on line 6—6 of FIG. 1, showing the construction of a three way or trihedron corner;

FIG. 7 is a longitudinal section taken on line 7—7 of FIG. 6;

FIG. 8 is an enlarged detail of the tongue and tongue retainer structure for connecting the primary membrane to the primary insulation layer, taken at the circular arrows marked A in FIG. 3;

FIG. 9 is a plan view of the cryogenic insulation system of FIG. 1, showing both the primary and the secondary liner leak detection systems;

FIG. 10 illustrates an alternative type of primary liner leak detection channel;

FIG. 11 is a further modification of the primary liner leak detection system;

FIG. 15 is a section similar to FIG. 2, showing the construction at a 90° transverse corner section, including the standoff panel and the means for supporting same at such corner;

FIG. 16 is a section similar to FIG. 6, showing the construction at a three way corner, and including a standoff panel; and FIG. 17 is a section similar to FIG. 7, and including the standoff panel, taken on line 17—17 of FIG. 16.

DESCRIPTION OF THE PREFERRED EMBODIMENT

Figure 12:
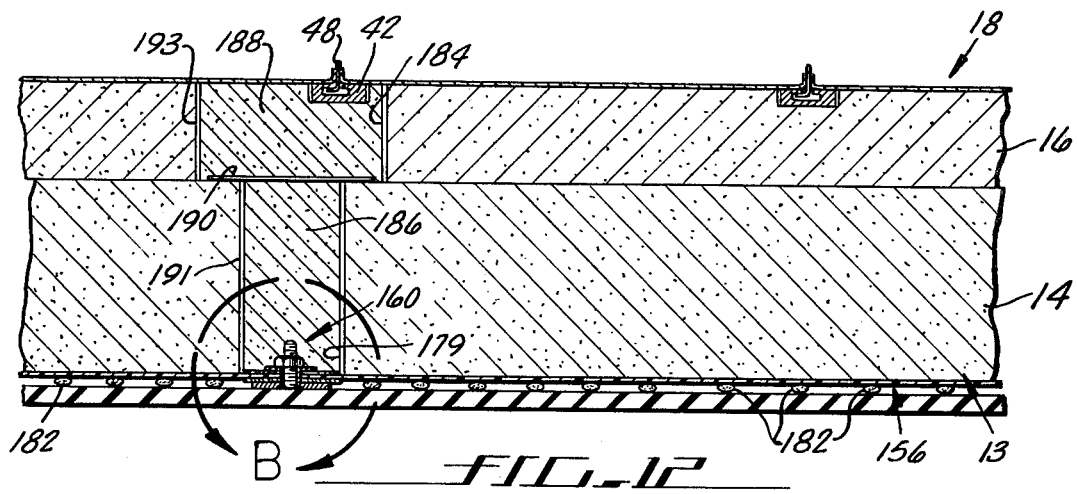
FIG. 12 is a transverse section similar to FIG. 3, showing a modification employing a stand-off or insulation support panel.

Referring to FIG. 1 of the drawing, numeral 10 indicates a cryogenic liquid or LNG tanker having an inner hull 12 and an insulation system 13 positioned around the inner hull. Such insulation system is comprised of an outer fiber reinforced foam insulation layer 14 disposed against the inner hull 12, and an inner fiber reinforced foam insulation layer 16. Such fiber reinforced foam insulation layers are preferably three-dimensional glass fiber reinforced polyurethane foam layers. Such fiber reinforced insulation material comprises blocks or panels of closed cell polyurethane foam having layers of glass fibers, each layer of fibers extending in both a horizontal and transverse direction, the X and Y reinforcement fibers, and layers of fibers extending in a vertical direction, the Z reinforcement fibers.

FIG. 1a illustrates this type of material comprising blocks 17 of closed cell polyurethane foam having layers of glass fibers 19 embedded in the foam and having exposed fiber ends 21 to facilitate bonding of the reinforced polyurethane blocks 17 to a structural member such as a tank wall. The polyurethane block 17 has other glass fibers 23 extending vertically, with exposed fiber ends 25 to facilitate bonding of the individual blocks to each other, and layers of other fibers 27 extending horizontally and normal to the fibers 19. This type of reinforcement is known as X-Y-Z reinforcement, the X fibers being longitudinal fibers, the Y fibers transverse fibers and the Z fibers vertical fibers, e.g. as shown in U.S. Pat. No. 3,222,868, and the resulting reinforced foam is also known as "3D foam". Preferably, planks of such 3D polyurethane foam are bonded together by a suitable adhesive, preferably a polyurethane adhesive, to form the respective outer and inner insulation layers 14 and 16, respectively.

A thin primary liner or barrier membrane 18 is positioned in contact with the inner 3D foam insulation layer 16 and is connected thereto in the manner described more fully below. Such primary membrane is a low temperature resistant (low thermal expansion) material such as nickel steel, preferably a high nickel steel such as the material marketed as Invar, although other materials such as stainless steel can be employed. The membrane 18 is a fluid impermeable material and forms an interior membranous vessel for containment of the cryogenic liquid. A secondary liner 20 is sandwiched between the outer 3D foam insulation layer 14 and the inner 3D foam insulation layer 16. Such liner can be a combination of fiber glass cloth with a thin metal, e.g. aluminum, foil or such secondary liner can be a resin impregnated fiber glass cloth e.g. impregnated with polyurethane resin, or such resin impregnated fiber glass cloth in combination with a polyvinyl fluoride film marketed as Tedlar. Such secondary liner can be an imperforate liner, which prevents penetration of cryogenic liquid from the inner foam insulation layer 16 to the outer foam insulation layer 14.

Referring to FIG. 2 of the drawing, the first step in the installation of the insulation system 13 of the invention is the location and installation of a plurality of studs 22 disposed at spaced intervals on the inner ship hull 12, and resistance welded thereto as indicated at 24. These studs provide tie down points for reaction to the loads transmitted by the primary high nickel steel or Invar liner 18, as pointed out more fully hereinafter. Once the studs are welded in place on the container wall or inner ship hull, the outer 3D fiber reinforced polyurethane foam insulation layer 14 is adhesively bonded at 26 to the inner ship hull 12. As previously indicated, the 3D fiber reinforced polyurethane foam insulation forming the outer layer 14 is fabricated in rectangular planks or blocks 17, e.g. about 2 feet wide and about 10 feet long, and such planks bonded together by a suitable adhesive, as indicated at 28, and best seen in FIG. 3. The outer or first layer of 3D fiber reinforced polyurethane foam insulation 14 is adhesively bonded to the ship hull 12 using a vacuum bag technique or other suitable means to apply pressure to hold the parts in place during cure of the adhesive.

The resin impregnated fiber glass secondary liner 20 is bonded to the respective planks 17 of 3D polyurethane foam forming the outer insulation layer 14, before such planks are installed and bonded to the ship hull 12, and following such installation, an overlap splice 30 is applied between the planks to make the secondary liner 20, e.g. polyurethane impregnated fiber glass cloth combined with a polyvinyl fluoride film, continuous over the surface of the outer layer of foam insulation 14.

The 3D foam insulation planks 17 in the outer foam layer 14 are provided with a system of interconnected channels 32. As noted in FIG. 9, the channels 32 run in a horizontal direction along the plank-to-plank bonds and are then manifolded together along the corners, as indicated at 38, the manifold being connected to a vacuum pump (not shown) to form the secondary liner leak detection system. The channels 32 can be a plastic or fiber glass channel disposed in mating grooves 36 formed in the polyurethane foam planks 17 and adhesively secured at 37 at the plank-to-plank adhesive bonds 28.

After installation of the first or outer layer of foam insulation 14 and the secondary liner 20, the second or inner layer of foam insulation 16 is adhesively bonded in place in contact with the secondary liner 20, employing the same procedure as for installing the first foam insulation layer 14, that is by bonding together 3D foam insulation planks 17' similar to the planks 17, and adhesively bonding the plants together at 28'. After the inner foam insulation layer 16 has been adhesively bonded in place over the first layer 14, grooves 40 are cut in the upper surface of the inner foam layer 16, such grooves being cut parallel to the ship's axis on longitudinal surfaces. Such grooves provide a recess in the inner foam insulation layer 16 to receive a plywood tongue retainer strip 42, which is bonded at 43 to the inner foam insulation layer 16, as shown in detail in FIG. 8 of the drawing. As will be described in further detail hereinafter, the tongue retainer strips 42 serve to connect the primary high nickel steel liner 18 to the inner layer of foam insulation 16. Referring again to FIGS. 3 and 8, it will be seen that the primary liner 18 is formed of a plurality of sections or strakes 44, each section having upstanding flanges 46 at its opposite sides. Between the adjacent flanges 46 of the liner sections 44 is positioned a tongue 48, preferably also formed of low temperature resistant material such as high nickel steel, the lower or inner portion of tongue 48 being received in a channel 50 in the plywood tongue retainer strip 42, and the bent portion 52 of the tongue 48 being received in a channel 54 formed in the tongue retainer strip 42, and at a 90° angle to channel 50. The upper portion of the tongue 48 is welded at 56 to the flanges 46 of the primary liner sections 44. It will thus be seen that the plywood strip 42 functions to retain the tongues 48 which are connected to the primary liner sections 44, and thus holds the primary liner or membrane 18 in place against the inner layer of foam insulation 16. Also, the channels 50 and 54 in the retainer strip 42 serve as a channel for the primary membrane leak detection system for a purge system to remove the oxygen from behind the primary liner. The primary membrane barrier leak detection channels 50, 54 are manifolded together at 58, as illustrated in FIG. 9, and connected to a vacuum pump (not shown). The channels 50 and 54 may also be manifolded together where they intersect the cavity 76 formed at the transverse 90° corners shown in FIG. 2. The primary barrier leak detection system serves several functions, namely, to determine if leaks exist in the primary membrane or liner 18, to limit the external pressure and remove the oxygen behind the primary membrane so as to prevent it from being damaged by duckling into the empty or partially full tank, as a leak detection system for the primary membrane, to remove liquid or gas products which leak through the primary membrane, and as a test system to evaluate the integrity of the secondary liner-barrier system. The above described secondary channel system is employed to detect leaks in the secondary liner 20.

Now referring to FIGS. 1 and 2a, showing the right angle corner design of the invention system along a horizontal and vertical transverse interface, and which is adapted to take tension loads in both the horizontal and transverse direction at 90° from the primary membrane 18 to the ship hull 12, there is provided a plurality of coupler systems 60 positioned at spaced approximately equal intervals within the foam insulation layers 14 and 16, in a plane normal to the plane of FIG. 2, and a plurality of like coupler systems 60' positioned at right angles to the coupler systems 60 and spaced from each other in a plane perpendicular to the plane of FIG. 2 and also perpendicular to the plane of the coupler systems 60. Coupler systems 60' are positioned alternately between adjacent coupler systems 60, as seen in FIG. 2a, and are likewise positioned within the 3D foam insulation layers 14 and 16.

Referring to the coupler system 60, such systems each comprise a tubular non-metallic, preferably plastic, coupler 62 which is disposed around one of the studs 22 and passes through the outer foam insulation layer 14 and extends part way into the inner foam insulation layer 16. Although non-metallic couplers are preferred, metallic couplers such as a steel coupler can also be used. The coupler is held in place within the foam insulation layers and against the inner ship hull 12, by an adhesive bond 64 or by tack welding the coupler to the stud 22. It will be noted that the secondary liner 20 is apertured to receive the coupler 60 and a secondary, e.g. resin impregnated, fiber glass liner splice 66 is provided to fit around the coupler and is adhesively bonded in place thereagainst.

The corner insulation system is shown in FIG. 2 for a 90° corner includes a high nickel steel angle assembly 68 of substantially the same thickness as the primary liner 18, and formed of a pair of angle members 70 and 70' disposed at right angles to each other and interconnected by an angle piece 72 which is welded to angle members 70 and 70' to hold them in position. Each of the angle members 70 and 70' carries at its inner end a flange 74 or 74' bent at a right angle to the respective angle members 70 and 70'.

Positioned within cut away portions or cavities 76 and 76' of the inner foam insulation layer 16 adjacent the right angle corner, are two plywood corner support members 78 and 78', which are hollowed out at each end, as indicated at 80. Screws as indicated at 82 are provided to hold the plywood supports 78 and 78' and the angle members 70 and 70', together in the cut outs 76 and 76', within the foam insulation layer 16. Although insulating corner support members 78 and 78' are preferred, these can be metallic members. The plywood supports 78 and 78' are each cut away to provide a recess 88 to receive an asbestos-stainless steel weld insulation member 90. The adjacent ends of the primary membrane 18 are welded at 91 to angle members 70 and 70'.

Connected to the plywood corner support, e.g. 78, at the corner assembly is a threaded steel rod 84. The steel rod 84 is threadably engaged at its outer end 85 with the coupler 62, and is fixed in position against a shoulder 87 of the plywood corner support by means of a nut 86. The center of the coupler 62 is filled with foam insulation as at 89. The coupler systems 60' are of the same construction as the aboe described coupler systems 60.

It will be noted that the flange 74 of angle member 70 is positioned around the inner shoulder 92 of the plywood support 78 and flange 74' of angle member 70' is positioned around inner shoulder 92' of plywood support 78', to secure such angle members to the respective plywood supports. Also, it will be noted that the steel rod 84 is parallel to angle member 70 and the associated liner section 18a connected thereto, and steel rod 84' is parallel to angle member 70' and associated liner section 18a' connected thereto.

It will thus be seen that when the ship is filled with cryogenic liquid such as LNG, the tension loads thus applied by the primary liner 18 and liner section 18a and the angle assembly 68 at the right angle corner in a horizontal direction, viewing FIG. 2, is taken by the coupler systems 60, i.e. the plywood support 78, its associated steel rod 84 and the coupler 62, and such reactive force is transmitted to the inner ship hull 12. For tension loads applied by the primary liner in a vertical direction, as seen in FIG. 2, such loads are taken by the similar coupler systems 60' and transmitted to the inner ship hull 12. Thus, the coupler assemblies 60 and 60' take the tension loads from the primary liner 18 at the right angle corner directly into the ship hull, and the nonmetallic or plastic couplers 62, and 62' control the thermodynamic characteristics to provide further insulation. Thermal tests have indicated, however, that steel couplers can also be used. The couplers 62 and 62' further function to seal the secondary liner 20 and prevent penetration of cryogenic liquid in the event that the primary liner is penetrated and the inner foam insulation layer 16 is penetrated by cryogenic liquid. It is further noted that the use of the 3D reinforced foam insulation also is of advantage in taking tension loads, and the thermal load is also taken by the 3D foam insulation at the corners.

Coupler system 60a and 60a' for a 90° corner on an oblique surface are illustrated in FIG. 5 of the drawing. These coupler systems are similar to the coupler system 60 and 60' of the right angle corner described above and illustrated in FIG. 2. However, in the system of FIG. 5 there are provided short steel tubes 94, 94' which are welded to the inner ship hull 12 and a plastic coupler, such as an injection molded polyester coupler at 96, 96' is threaded into the steel tube 94 or 94'. The end of the steel rod 84, 84' is threaded into a steel insert as at 98 which in turn is threaded into the inner end of the coupler 96. The outer end portion of the coupler 96, 96' is hollowed out and filled with foam insulation as at 100, and the outer ends of such couplers are adhesively bonded as at 101 to the inner ship hull 12. It will be seen that the right angle corner support system of FIG. 5 functions in a manner similar to that of FIG. 2 to take tension loads produced by contraction of the primary liner in two directions perpendicular to each other, and to transfer such tension forces efficiently to the ship hull.

Referring now to FIG. 4 of the drawing there is shown a longitudinal corner assembly at an oblique angle of 135°. Such longitudinal corner design differs from the 90° corner in that the membrane load reacted by the insulation support system is lower as compared to tht for the 90° corner system of FIGS. 2 and 5. In the corner design of FIG. 4 there is provided a pair of plywood insulation strips 102 received in recesses 104 in the inner foam insulation layer 16 and extending in opposite directions from the corner. The plywood strips 102 are adhesively bonded to the foam insulation at 106. If desired, although insulating non-metallic support strips 102 are preferred, metallic support strips can be used. A 135° high nickel steel corner angle membrane 108 is fitted over the plywood corner strips 102 and is connected thereto by drive pin rivets 112, or wood screws. The overlapping end portions of the primary liner 18 and the corner angle member 108 are attached by welding at 110. As previously noted, the tension loads at such 135° corner transmitted from contraction of the primary liner to the ship hull are relatively low as compared to the tension forces at the 90° corners. The asbestos/stainless steel weld insulation member 90 employed in the 90° corner support illustrated in FIG. 2, can also be employed for weld protection in the 135° corner design of FIG. 4, if required, by recessing the plywood insulating strips 102 to the thickness of such stainless steel/asbestos board.

Now referring to FIG. 6 there is shown the construction of the 3 way or trihedron corner structure at intersections of the 135° corner and the transverse or 90° corner. Such 3 way corner resists both tension and bending loads. As seen in FIGS. 6 and 7, there is provided a steel trihedron corner member 114, two sides 116 of which form an angle of 135°, the third side 118 forming a 90° angle with each of the sides 116. The 135° angle sides 116 are each positioned over a plywood support 120 received in recesses 122 in the inner foam insulating layer 16, and the third side 118 of the trihedron angle is positioned in contact with a plywood support 124 received in a recess 126 in the inner foam insulating 16, the plywood support 124 being disposed at a 90° angle to the plywood supports 120. Thus, the plywood support formed of members 120 and 124 is also in the form of a trihedron, and although such trihedron support is preferably a non-metallic insulating member, such trihedron support can be metallic.

Each of the two sides 116, and the third side 118 of the trihedron angle 114 is supported on a fiber glass or steel tube coupler 128 which is normal to each of such sides and extends through both the inner and outer foam insulation layers 16 and 14, respectively, from the respective sides of the trihedron to the inner ship hull 12. The outer ends of each of the coupler tubes 128 are threaded into a steel tube 130 which is welded at 132 to tube inner ship hull 12.

The coupler tubes 128 are adhesively bonded and sealed at 134 to the adjacent foam layers 14 and 16, a secondary fiber glass liner splice 136 being fitted around the coupler tube 128 and adhesively bonded and sealed in place.

A steel insert 138 is threadably connected into the upper end of each of the coupler tubes 128, and receives a bolt 140 for connecting the respective sides 116 and 118 of the trihedron angle 114 to the fiber glass tubes. The interior of tubes 128 between the insert 138 and the inner ship hull 12 are filled with polyurethane foam 142. The end portions of the primary high nickel steel liner 18, as shown at 144, are welded at 146 to the respective sides 116 and 118 of the trihedron angle.

It will be seen in FIG. 7 that the 90° angle portions of the trihedron angle construction, tension loads due to contraction of the primary liner 18 are transmitted in both directions at 90° to each other, to the ship hull through the fiber glass tubes or couplers 128, such tubes with the urethane foam filler 134 contained therein providing efficient insulation between the steel trihedron angle 114 and the inner ship hull 12. As seen in FIG. 6, any bending loads imparted by the contraction of the primary liner 18 as the trihedron corner are resisted by the fiber glass tubes 128 connected to the sides 116 of the trihedron angle, and which are in turn attached to the further ship hull.

Although as illustrated in FIG. 8, the channels 50 and 52 formed in the plywood tongue retainer strips 42 serve as leak detection channels at the connections of the tongues 48 to the primary high nickel steel membrane or liner 18, there can also be provided additional leak detection channels at other locations in the inner foam insulation layer 16, and between the locations of the tongues 48 along the primary liner. Thus, as illustrated in FIG. 10, there can also be provided plywood channel members 148 positioned at spaced locations in recesses 150 of the inner primary foam insulation layer 16 below the primary high nickel steel liner 18, such plywood channel members containing a groove or channel 152, a plurality of such channels being interconnected and manifolded as described above, and connected to a vacuum pump if desired, for leak detection or to purge the oxygen out of the space between the primary member 18 and the inner foam layer 16 for fire protection. This area is then filled with nitrogen using the channels for this purpose.

As an alternative to the leak detection system illustrated in FIG. 10, the surface of the inner foam insulation layer 16 adjacent the primary liner 18, as illustrated in FIG. 11, can be roughened orr provided with grooves, as indicated at 154, to provide leak detection channels for the membrane 18, such leak detection channels being manifolded and if desired connected to a vacuum pump, as noted above. By application of a vacuum to such grooves 154, or to the channels 50 and 54 in FIG. 8, the primary liner 18 is further held lightly against the inner foam insulation layer 16. These channels 154 may also be used to remove the products of any leak through the primary membrane 18.

Figure 13:
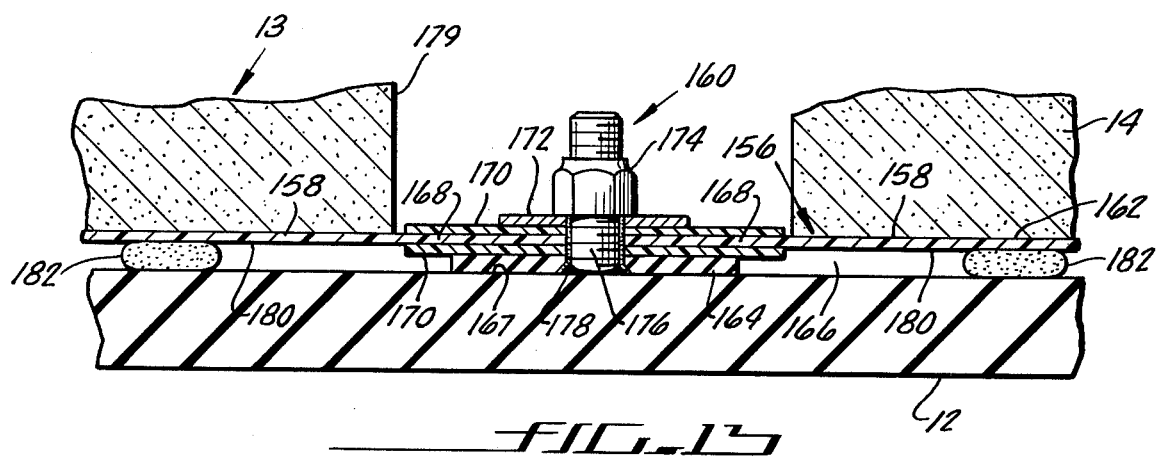
FIG. 13 is an enlarged detail taken at the circular arrows marked B in FIG. 12, showing the stand-off panel and the means for maintaining it spaced from the inner ship hull.

Referring to FIGS. 12 and 13 of the drawing, there is shown an additional feature or modification of the invention system. Thus, instead of placing the outer foam insulation layer 14 in direct contact with and bonded to the inner ship hull 12, as illustrated in FIGS. 2 and 3, there is provided according to the present embodiment and feature, means for supporting and maintaining the outer foam insulation layer 14 spaced from the inner ship hull and avoiding the necessity for bonding the outer surface of the insulation layer 14 to the wall or inner ship hull 12. This feature thus avoids having to heat the inner wall or ship hull 12 for the purpose of adhesively bonding the foam insulation layer 14 thereto, and also affords a sump for trapping any water leaking through the inner ship hull.

Referring to FIGS. 12 and 13, there is thus provided a stand off or insulation support panel 156 extending substantially entirely around tthe foam insulation system 13, which supports the outer foam insulation 14 and is in turn supported in spaced relation from the inner ship hull 12. The stand off panel 156 can be formed of a suitable material such as resin impregnated fiber glass reinforced plastic, a plastic such as polyvinyl fluoride, or plywood (glue laminated wood sheets), of sufficient strength to support the insulation system 13 and at the same time providing additional insulation effectiveness.

The stand off panel 156 is formed of a plurality of panel members 158 which are joined together and supported in spaced relation from the inner ship hull 12, by the connecting structure indicated generally at 160. The stand off or insulation support panel members are adhesively bonded at 162 to the outer surface of the outer foam insulation layer 14. The connection structure 160 comprises a spacer 164, e.g. in the form of a steel shim, of suitable thickness. The thickness of the spacer 164 is selected so that a suitable space or gap 166, e.g. 4 to 12 mm, will be provided between the stand off panel 156 and the inner ship hull 12 and affording a flat surface of attachment for the stand off panel. Such spacer 164 can be adhesively bonded at 167 to the inner ship hull 12, or attached as by tack welding to the inner ship hull.

The adjacent edge portions 168 of panel members 158 are sandwiched between a pair of resin impregnated fiber glass reinforced plastic or plywood splice strips 170 and such assembly is held in place by a steel washer 172 and nut 174 on a stud 176 which is welded at 178 to the inner ship hull 12. The adjoining surfaces of the outer edge portions 168 of panel members 158, and the splice strips 170 are adhesively bonded together by coating with adhesive prior to assembly of these parts, to form a bond and seal between the adjacent panel members 158. The entire connector device 160 is positioned within a suitable cutout portion 179 of the adjacent outer foam insulation layer 14, as best seen in FIG. 12. A plurality of such connector systems 160 are provided at suitable spaced intervals around the entire foam insulation system 13 within the inner ship hull 12.

The central portions 180 of the stand off panel numbers 158 are supported by and/or attached to the inner ship hull 12 by means of a plurality of spaced beads or adhesive strips 182 sandwiched between the panel members 158 and the inner ship hull 12, and off a thickness such as to maintain the stand off or insulation support panel members 158 flat and substantially parallel with the inner ship hull along the length and periphery of the stand off or insulation support panel 156 around the foam insulation system 13. The beads or strips 182 can be formed of any suitable material such as resin impreganted fiber glass, plastics and the like, and adhesively bonded to the adjacent surfaces of the stand off panel members 158 and the inner ship hull 12. In preferred practice such support beads or strips are spaced uniformly across or along the length of the stand off or insulation support panel 156. The space 166 behind the stand off panel 156 provides a cavity of sump for the collection of water which may leak through fatigue cracks in the inner ship hull, and such water may be channelled to the bottom of the ship and removed by suitable means (not shown).

The spaces 179 and 184 above the connections 160 are filled with two 3D foam insulation strips 186 and 188 with an overlapping secondary liner splice 190 e.g. of resin impregnated fiber glass, sandwiched between the strips 186 and 188, which are adhesively bonded to the adjacent foam insulation layers 14 and 16, and 191 and 193, respectively.

Figure 14:
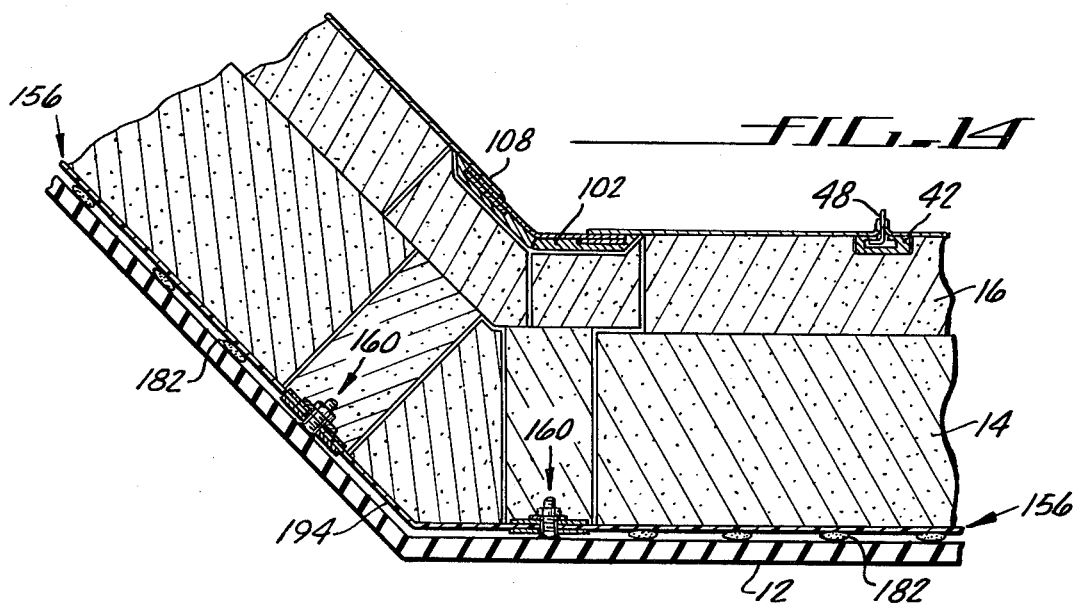
FIG. 14 is a section similar to FIG. 4, showing the construction at a 135° longitudinal corner, including the standoff panel of FIG. 12 and the means for supporting same at such corner.

The structures shown in FIGS. 12 and 13 illustrate the construction and placement of the stand off panel 156 along all portions of the inner tank surface except for the corners. Referring to FIG. 14, showing a 135° longitudinal corner like that shown in FIG. 4, it is seen that the connector structures 160 are positioned adjacent the apex of the corner, and a corner stand off or insulation support panel member 194 having an angle of 135° is positioned between the adjacent connector systems 160 at such 135° corner, and connected at opposite ends to the stand off panel 156.

FIG. 15 illustrates the stand off panel construction at a 90° corner angle such as that illustrated in FIG. 2. In FIG. 15, there is provided a steel corner stand off plate 196 in the form of a right angle, which is supported at its opposite end portions by studs 198 welded to the inner ship hull 12. For this purpose the end portions of the corner stand off plate 196 are provided with angle members 200 which are held in position by the studs 198 and associated nuts 202, the angle members 200 being bent into a Z shape around the ends of the corner stand off plate 196 and providing a flat outwardly extending portion 204 held in position by the connector structures 160, such end portions 204 and the outer surface of the adjacent end portions of stand off corner plate 196, adjacent the studs 198 being adhesively bonded at 206 to the surface of the inner ship hull. It will be noted that the adhesive layer 206 is sufficiently thick to maintain the corner stand off or support plate 196 spaced a short distance from the inner ship hull.

In the corner structure of FIG. 15, it will be noted that the Nelson studs 22 to which the couplers 62 are connected, are mounted on the corner stand off plate 196, instead of on the inner ship hull 12, as in the embodiment of FIG. 2 not incorporating a stand off panel.

The stand off panel construction around the trihedron corner, formed of both the 135° corner and the 90° corner, as shown in FIGS. 6 and 7 is similar to that illustrated in FIGS. 14 and 15, except that the corner stand off panel corresponding to 194 and 196 in FIGS. 14 and 15, will be in the shape of a trihedron similar to that of the steel trihedron angle 114 in FIGS. 6 and 7, but spaced therefrom as illustrated in FIG. 15.

Such stand off panel construction for the trihedron or three way corner is shown in FIGS. 16 and 17. Thus, the stand off plate 208 in FIGS. 16 and 17 is in the form of a trihedron, with two sides 210 forming an angle of 135° with each other, and a third side 212 forming a 90° angle with each of sides 210. The sides 210 and 212 of trihedron stand off plate 208 are maintained in spaced relation from the inner ship hull 12 as in the case of stand off corner plates 194 and 196 in FIGS. 14 and 15, namely by employing the connecting structures 160 and the supporting and connecting components 198, 200, 202 and 204, shown in FIGS. 14 and 15, the stand off plate 208 being connected at its opposite ends to the main stand off panel 156. However, in the embodiment of FIGS. 16 and 17, it will be noted that the outer ends of the coupler tubes 128 are threaded into the steel tubes 130 which are in turn welded to the trihedron stand off plate 208. It will thus be seen that in this embodiment, both tension and bending loads due to contraction of the primary liner 18 will be transmitted through the couplers 128 to the stand off panel 208 and in turn from the stand off panel 208 to the inner ship hull 12.

It is accordingly seen that there is provided according to the invention novel support systems for the primary liner of a cryogenic insulation system for tanks and ships, including layers of reinforced foam insulation, and particularly incorporating corner structures at varying angles, designed especially to transmit both tension and bending loads from the primary membrane to the inner ship hull, and avoiding buckling and rupture of the primary membrane, as well as the foam insulation layers between the primary membrane and the tank wall or ship hull. Novel means are provided for attachment of the primary or inner liner membrane to the insulation without adhesive bonding therebetween, and various means are afforded for leak detection both in the primary insulation system adjacent the primary membrane, and in the secondary insulation system adjacent the secondary liner membrane. Also provided are means to support and maintain the foam insulation system spaced from the inner wall of a container or ship hull, avoiding attachment of the foam insulation to the wall or ship hull and affording a water sump to trap water adjacent the inner ship hull.

Although the cryogenic insulation system of the invention is particularly effective for use on ships or tankers, such system can be used on any container for cryogenic liquids, including barges, storage tanks, aircraft or space vehicles. The thickness of the 3D fiber reinforced foam insulation in the system can be varied to limit the boiloff to suit the need of the specific design.

While I have described particular embodiments of my invention for purposes of illustration, it is understood that other modifications and variations will occur to those skilled in the art, and the invention accordingly is not to be taken as limited except by the scope of the appended claims.

What is claimed is:

1. A container for cryogenic liquefied gases which comprises a container wall, at least one fiber reinforced plastic foam insulation layer disposed within said container wall, a low temperature resistant metal liner in contact with the inner side of said at least one foam insulation layer, mechanical fastener means connected to and depending from said metal liner at spaced locations along said liner, retainer means disposed in and connected to said at least one foam insulation layer adjacent said inner side thereof, said retainer means comprising a plurality of strips positioned at spaced locations within said foam insulation layer and secured thereto, said fastener means being engaged in said strips and holding said metal liner in position against said at least one foam insulation layer, said container having corners and including at least one corner structure, said corner structure comprising coupler means positioned in said at least one foam insulation layer, said coupler means comprising an elongated member bonded to said at least one foam insulation layer, and means connecting said metal liner to said coupler means, said connecting means including a corner support member in said at least one foam insulation layer adjacent said metal liner, and means connecting said coupler means to the wall of said container, said coupler means transmitting tension loads from said metal liner to the wall of said container.

2. A container as defined in claim 1, said corner structure being positioned at a 90° corner of said container wall, said corner support member being a non-metallic insulating or metallic corner support, said corner support being disposed in and supported by said at least one foam insulation layer adjacent said metal liner at said 90° corner of said container wall, and means connecting said metal liner to said corner support, said means connecting said metal liner to said coupler means including rod means mounted on said corner support and connected to said coupler means.

3. A container for cryogenic liquefied gases which comprises a container wall, at least one fiber reinforced plastic foam insulation layer disposed within said container wall, a low temperature resistant metal liner in contact with the inner side of said at least one foam insulation layer, tongue means connected to and depending from said metal liner at spaced locations along said liner, retainer means disposed in and connected to said at least one foam insulation layer adjacent said inner side thereof, said retainer means comprising a plurality of strips positioned at spaced locations within said foam insulation layer and secured thereto, said strips including tongue retainer means, said tongue means being engaged in said tongue retainer means and holding said metal liner in position against said at least one foam insulation layer, said container having corners and including at least one corner structure, said corner structure comprising non-metallic insulating coupler means positioned in said at least one foam insulation layer, said coupler means comprising an elongated member bonded to said at least one foam insulation layer, and means connecting said metal liner to said coupler means, said connecting means including a corner support member in said at least one foam insulation layer adjacent said metal liner, and means connecting said coupler means to the wall of said container, said corner support member and said coupler means transmitting tension loads from said metal liner to the wall of said container.

4. A container as defined in claim 3, said tongue retainer means including a channel, said tongue means being retained in said channel, and means communicating with said channel to form a leak detection gas purge system in said at least one layer of foam insulation.

5. A container as defined in claim 3, including a second fiber reinforced plastic foam insulation layer adjacent said at least one foam insulation layer and disposed adjacent said container wall, a second liner positioned between said at least one foam insulation layer and said second foam insulation layer, said second liner acting as barrier to passage of cryogenic fluid from said at least one foam insulation layer into said second foam insulation layer, said strips being bonded to said at least one foam insulation layer adjacent said metal liner.

6. A container as defined in claim 5, said metal liner being high nickel steel and said foam insulation layers being X, Y, and Z fiber reinforced polyurethane foam insulation layers.

7. A container for cryogenic liqueified gases which comprises a container wall, at least one fiber reinforced plastic foam insulation layer disposed within said container wall, a low temperature resistant metal liner in contact with the inner side of said at least one foam insulation layer, mechanical fastener means connected to and depending from said metal liner at spaced locations along said liner, retainer means disposed in and connected to said at least one foam insulation layer adjacent said inner side therof, said retainer means comprising a plurality of strips positioned at spaced locations within said at least one foam insulation layer and secured thereto, said fastener means being engaged in said strips and holding said metal liner in position against said at least one foam insulation layer, and including a second fiber reinforced plastic foam insulation layer adjacent said at least one foam insulation layer and disposed adjacent said container wall, a second liner positioned between said at least one foam insulation layer and said second foam insulation layer, said second layer acting as barrier to passage of cryogenic fluid from said at least one foam insulation layer into said second foam insulation layer, said container including a corner having a corner structure, said corner structure comprising coupler means positioned in said at least one foam insulation layer and in said second foam insulation layer, said coupler means comprising an elongated member bonded to said at least one insulation layer and to said second insulation layer, and means connecting said metal liner to said coupler means, said connecting means including a corner support member in said at least one foam insulation layer adjacent said metal liner, and means connecting said coupler means to the wall of said container, said coupler means transmitting tension loads from said metal liner to the wall of said container.

8. A container for cryogenic liquefied gases which comprises a container wall, at least one fiber reinforced plastic foam insulation layer disposed within said container wall, a low temperature resistant metal liner in contact with the inner side of said at least one foam insulation layer, mechanical fastener means connected to and depending from said metal liner at spaced locations along said liner, retainer means disposed in and connected to said at least one foam insulation layer adjacent said inner side thereof, said retainer means comprising a plurality of strips positioned at spaced locations within said foam insulation layer and secured thereto, said fastener means being engaged in said strips and holding said metal liner in position against said at least one foam insulation layer, said container wall having a corner portion forming a trihedron angle, including a trihedron member having a pair of side portions forming an obtuse angle and a third side portion forming a right angle with each of said pair of side portions, said metal liner being connected to said trihedron member, a trihedron corner support for said trihedron member, said corner support being disposed in and supported by said at least one foam insulating layer adjacent said trihedron member, and coupler members connecting each of said sides of said trihedron member to said container wall, said coupler members being disposed at right angles to said sides, said coupler members being bonded to said at least one foam insulation layer.

9. A container for cryogenic liquefied gases which comprises a container wall, at least one fiber reinforced plastic foam insulation layer disposed within said container wall, a low temperature resistant metal liner in contact with the inner side of said at least one foam insulation layer, mechanical fastener means connected to and depending from said metal liner at spaced locations along said liner, retainer means disposed in and connected to said at least one foam insulation layer adjacent said inner side thereof, said retainer means comprising a plurality of strips positioned at spaced locations within said foam insulation layer and secured thereto, said fastener means being engaged in said strips and holding said metal liner in position against said at least one foam insulation layer, said container wall having a corner portion forming a trihedron angle, including a trihedron member having a pair of side portions forming an obtuse angle and a third side portion forming a right angle with each of said pair of side portions, said metal liner being connected to said trihedron member, a trihedron corner support for said trihedron member, said corner support being disposed in and supported by said at least one foam insulating layer adjacent said trihedron member, and coupler members connecting each of said sides of said trihedron member to said container wall, said coupler members being disposed at right angles to said sides, said trihedron corner support being a non-metallic trihedron insulating corner support, said coupler members being non-metallic coupler members and said coupler members passing through said trihedron insulating corner support.

10. A container for cryogenic liquefied gases which comprises a container wall, at least one fiber reinforced plastic foam insulating layer disposed within said container wall, a low temperature resistant metal liner in contact with the inner side of said at least one foam insulation layer, tongue means connected to and depending from said metal liner at spaced locations along said liner, retainer means disposed in and connected to said at least one foam insulation layer adjacent said inner side thereof, said retainer means comprising a plurality of strips positioned at spaced locations within said foam insulation layer and secured thereto, said strips including tongue retainer means, said tongue means being engaged in said tongue retainer means and holding said metal liner in position against said at least one foam insulation layer, said container having corners and including at least one corner structure, said corner structure comprising metallic coupler means positioned in said at least one foam insulation layer, said coupler means comprising an elongated member bonded to said at least one foam insulation layer, and means connecting said metal liner to said coupler means, said connecting means including a corner support member in said at least on foam insulation layer adjacent said metal liner, and means connecting said coupler means to the wall of said container, said corner support member and said coupler means transmitting tension loads from said metal liner to the wall of said container.

11. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary high nickel steel low temperature resistant low thermal expansion liner in contact with the inner surface of said primary foam insulation layer, a secondary liner on the inner surface of said secondary foam insulation layer and between adjacent surfaces of said primary and secondary foam insulation layers, tongue means connected to said primary liner at spaced locations along said primary liner and extending outwardly into said primary foam insulation layer, tongue retainer means disposed in and connected to said primary foam insulation layer adjacent said inner surface thereof, said retainer means comprising a plurality of strips within grooves formed in said primary foam insulation layer, said strips being bonded to said primary foam insulation layer and containing channels, said outwardly extending tongue means being engaged in said channels and holding said primary liner in position against said primary foam insulation layer, said tongue means comprising a plurality of high nickel steel tongues spaced along said primary liner, each of said tongues connected to said primary liner, said strips being plywood strips disposed in and bonded to said primary foam insulation layer adjacent said primary liner and said respective tongues, said tongues each having an outwardly extending portion engaged in the channels of an adjacent plywood strip, said channels being interconnected to form a leak detection system for said primary foam insulation layer, said tongues each having an inwardly extending portion, said inwardly extending portion being welded to adjacent sections of said primary liner, said outwardly extending portion of each of said tongues having a bent portion, said channels of each of said plywood strips formed of a plurality of at last two interconnected channels disposed at an angle to each other, the outwardly extending bent portion of each of said tongues being engaged in one of said last-mentioned channels, said inner ship hull having a 90° corner, the foam insulation system including a 90° corner structure at said corner, said primary liner being disposed at said corner with adjacent portions thereof at a 90° angle to each other, a corner support for said primary liner in said primary foam insulation layer, means connecting said corner support to said primary liner, coupler positioned in both said primary and said secondary foam insulation layers adjacent said corner structure, said coupler being an elongated member disposed parallel to one of said portions of said primary liner at said 90° corner, means connecting said corner support to said coupler and means connecting said coupler to said inner ship hull, said corner support and said coupler transmitting tension loads from aid primary liner to said inner ship hull.

12. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary high nickel steel low temperature resistant low thermal expansion liner in contact with the inner surface of said primary foam insulation layer, a secondary liner on the inner surface of said secondary foam insulation layer and between adjacent surfaces of said primary and secondary foam insulation layers, tongue means connected to said primary liner at spaced locations along said primary liner and extending outwardly into said primary foam insulation layer, tongue retainer means disposed in and connected to said primary foam insulation layer adjacent said inner surface thereof, said retainer means comprising a plurality of strips within grooves formed in said primary foam insulation layer, said strips being bonded to said primary foam insulation layer and containing channels, said outwardly extending tongue means being engaged in said channels and holding said primary liner in position against said primary foam insulation layer, said tongue means comprising a plurality of high nickel steel tongues spaced along said primary liner, each of said tongues connected to said primary liner, said strips being plywood strips disposed in and bonded to said primary foam insulation layer adjacent said primary liner and said respective tongues, said tongues each having an outwardly extending portion engaged in the channels of an adjacent plywood strip, said channels being interconnected to form a leak detection system for said primary foam insulation layer, said inner ship hull having a 90° corner, the foam insulation system including a 90° corner structure at said corner, said primary liner being disposed at said corner with adjacent portions thereof at a 90° angle to each other, a corner support for said primary liner in said primary foam insulation layer, means connecting said corner support to said primary liner, a coupler positioned in both said primary and said secondary foam insulation layers adjacent said corner structure, said coupler being bonded to said primary and said secondary foam insulation layers, said coupler being an elongated member disposed parallel to one of said portions of said primary liner at said 90° corner, means connected said corner support to said coupler and means connecting said coupler to said inner ship hull, said corner support and said coupler transmitting tension loads from said primary liner to said inner ship hull.

13. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary high nickel steel low temperature resistant low thermal expansion liner in contact with the inner surface of said primary foam insulation layer, a secondary liner on the inner surface of said secondary foam insulation layer and between adjacent surfaces of said primary and secondary foam insulaton layers, a plurality of high nickel steel tongues spaced along said primary liner, each of said tongues connected to said primary liner, a plurality of plywood tongue retainer members in and bonded to said primary foam insulation layer adjacent said inner surface thereof and adjacent said primary liner, and positioned at spaced locations along said primary foam insulation layer, means forming channels in each of said retainer members, said tongues each having an outwardly extending portion engaged in the channels of an adjacent retainer member, and holding said primary liner in position against said primary foam insulation layer, said channels being interconnected to form a leak detection system for said primary foam insulation layer, said inner ship hull having a 90° corner, the foam insulation system including a 90° corner structure at said corner, said primary liner being disposed at said corner with adjacent portions thereof at a 90° angle to each other, a plurality of spaced parallel couplers positioned in both said primary and said secondary foam insulation layers adjacent said corner structure, said couplers being an elongated member disposed parallel to one of said portions of said primary liner at said 90° corner, and a plurality of second couplers spaced parallel to each other at a 90° angle from said first couplers, said second couplers being alternately disposed between adjacent first mentioned couplers at said 90° corner, means connecting said primary liner to each of said couplers at said 90° corner, and means connecting each of said couplers to the inner ship hull, said couplers transmitting tension loads from both of the 90° primary liner portions at said 90° corner, to said inner ship hull.

14. A ship for transporting cryogenic liquefied gases as defined in claim 13, of said couplers being tubular, said couplers being adhesively bonded to said primary and secondary insulation layers, said means connecting the primary liner to said couplers including threaded rods, the outer end of each of said rods being threadably engaged with the inner end of the respective couplers, a plywood corner support positioned in said primary foam insulation layer adjacent a surface of said primary liner at said 90° corner, and means connecting said primary liner to said plywood corner support, the inner end of said rods being engaged with said plywood corner supports.

15. A ship for transporting cryogenic liquefied gases as defined in claim 14, said means connecting the couplers to the inner ship hull including studs connected to said inner ship hull, one end of said tubular couplers being engaged over said studs.

16. A ship for transporting cryogenic liquefied gases as defined in claim 14, said couplers having a hollow portion, said hollow portion containing insulation material.

17. A ship for transporting cryogenic liquefied gases as defined in claim 14, said primary liner at said 90° corner comprising a pair of high nickel steel primary liner sections, each positioned and connected together at a 90° angle at said corners, the opposite ends of each of said sections being welded to the adjacent end portions of the primary liner, said liner sections each having a flange at its outer end and engaged with an outer shoulder of a plywood corner support.

18. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary high nickel steel low temperature resistant low thermal expansion liner in contact with the inner surface of said primary foam insulation layer, a secondary layer on the inner surface of said secondary foam insulation layer and between adjacent surfaces of said primary and secondary foam insulation layers, tongue means connected to said primary liner at spaced locations along said primary liner and extending outwardly into said primary foam insulation layer, tongue retainer means disposed in and connected to said primary foam insulation layer adjacent said inner surface thereof, said retainer means comprising a plurality of strips within grooves formed in said primary foam insulation layer, said strips being bonded to said primary foam insulation layer and containing channels, said outwardly extending tongue means being engaged in said channels and holding said primary liner in position against said primary foam insulation layer, said tongue means comprising a plurality of high nickel steel tongues spaced along said primary liner, each of said tongues connected to said primary liner, said strips being plywood strips disposed in and bonded to said primary foam insulation layer adjacent said primary liner and said respective tongues, said tongues each having an outwardly extending portion engaged in the channels of an adjacent plywood strip, said channels being interconnected to form a leak detection system for said primary foam insulation layer, said inner ship hull having an obtuse corner angle, a high nickel steel primary liner section disposed at a corresponding obtuse angle and welded to the opposite end portions of said primary liner, and a plywood corner support positioned in said primary insulation layer adjacent said primary liner obtuse angle section, said plywood corner support being in the form of an obtuse angle corresponding to said corner angle, and bonded to said primary foam insulation layer.

19. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary high nickel steel low temperature resistant low thermal expansion liner in contact with the inner surface of said primary foam insulation layer, a secondary liner on the inner surface of said secondary foam insulation layer and between adjacent surfaces of said primary and secondary foam insulation layers, tongue means connected to said primary liner at spaced locations along said primary liner and extending outwardly into said primary foam insulation layer, tongue retainer means disposed in and connected to said primary foam insulation layer adjacent said inner surface thereof, said retainer means comprising a plurality of strips within grooves formed in said primary foam insulation layer, said strips being bonded to said primary foam insulation layer and containing channels, said outwardly extending tongue means being engaged in said channels and holding said primary liner in position against said primary foam insulation layer, said tongue means comprising a plurality of high nickel steel tongues spaced along said primary liner, each of said tongues connected to said primary liner, said strips being plywood strips disposed in and bonded to said primary foam insulation layer adjacent said primary liner and said respective tongues, said tongues each having an outwardly extending portion engaged in the channels of an adjacent plywood strip, said channels being interconnected to form a leak detection system for said primary foam insulation layer, said inner ship hull having a corner structure in the form of a trihedron corner, including a metal trihedron member at said corner, said member having three sides, a pair of sides being disposed at an obtuse angle to each other and a third side being disposed at a 90° angle to each of said first two sides, said trihedron angle member being disposed at said trihedron corner and positioned along the inner surface of said primary foam insulation layer, said primary layer being connected to the three sides of said trihedron angle member, a plywood support for said trihedron member positioned in said primary insulation layer adjacent said trihedron member, a plurality of non-metal coupler tubes each connected at one end to one of the sides of said trihedron member at right angles thereto, each of said tubes extending through said primary and secondary foam insulation layers, means connecting the outer ends of said tubes to the inner ship hull, and means connecting the sides of said trihedron member to the inner ends of said tubes.

20. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary high nickel steel low temperature resistant low thermal expansion liner in contact with the inner surface of said primary foam insulation layer, a secondary liner on the inner surface of said secondary foam insulation layer and between adjacent surfaces of said primary and secondary foam insulation layers, said inner ship hull having a 90° corner, the foam insulation system including a 90° corner structure at said corner, said primary liner being disposed at said corner with adjacent portions thereof at a 90° angle to each other, a plurality of spaced couplers positioned in both said primary and said secondary foam insulation layers adjacent said corner structure, said couplers being elongated members disposed parallel to one of said portions of said primary liner at said 90° corner, and a plurality of second like couplers spaced parallel to each other at a 90° angle from said first couplers, said second couplers being alternately disposed between adjacent first mentioned couplers at said 90° corner, means connecting said primary metal liner to each of said couplers at said 90° corner, and means connecting each of said couplers to the inner ship hull, said couplers transmitting tension loads from both of the 90° primary liner portions at said 90° corner, to said inner ship hull.

21. A ship for transporting cryogenic liquefied gases as defined in claim 20, each of said couplers being tubular, said couplers being adhesively bonded to said primary and secondary insulation layers, said means connecting the primary liner to said couplers including threaded rods, the outer end of each of said rods being threadably engaged with the inner end of the respective couplers, a plywood corner support positioned in said primary foam insulation layer adjacent a surface of said primary liner at said 90° corner, and means connecting said primary liner to said plywood corner support, the inner end of said rods being engaged with said plywood corner supports.

22. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary low temperature resistant low thermal expansion liner in contact with the inner surface of said primary foam insulation layer, a secondary liner on the inner surface of said secondary foam insulation layer and between adjacent surfaces of said primary and secondary foam insulation layers, a plurality of tongues spaced along said primary liner, each of said tongues connected to said primary liner, a plurality of tongue retainer members in and bonded to said primary foam insulation layer adjacent said inner surface thereof and adjacent said primary liner, and positioned at spaced locations along said primary foam insulation layer, means forming channels in each of said retainer members, said tongues each having an outwardly extending portion engaged in the channels of an adjacent retainer member, and holding said primary liner in position against said primary foam insulation layer, said channels being interconnected to form a leak detection system for said primary foam insulation layer, said inner ship hull having a 90° corner, the foam insulation system including a 90° corner structure at said corner, said primary liner being disposed at said corner with adjacent portions thereof at a 90° angle to each other, a plurality of spaced parallel couplers positioned in both said primary and said secondary foam insulation layers adjacent said corner structure, said couplers being an elongated member disposed parallel to one of said portions of said primary liner at said 90° corner, and a plurality of second couplers spaced parallel to each other at a 90° angle from said first couplers, said second couplers being alternately disposed between adjacent first mentioned couplers at said 90° corner, means connecting said primary liner to each of said couplers at said 90° corner, and means connecting each of said couplers to the inner ship hull, said couplers transmitting tension loads from both of the 90° primary liner portions at said 90° corner, to said inner ship hull.

* * * * *